(12) United States Patent
Kataoka et al.

(10) Patent No.: US 11,402,343 B2
(45) Date of Patent: Aug. 2, 2022

(54) X-RAY FLUORESCENCE SPECTROMETER

(71) Applicant: RIGAKU CORPORATION, Akishima (JP)

(72) Inventors: Yoshiyuki Kataoka, Takatsuki (JP); Takao Moriyama, Takatsuki (JP)

(73) Assignee: RIGAKU CORPORATION, Akishima (JP)

( * ) Notice: Subject to any disclaimer, the term of this patent is extended or adjusted under 35 U.S.C. 154(b) by 0 days.

(21) Appl. No.: 17/599,228

(22) PCT Filed: Dec. 6, 2019

(86) PCT No.: PCT/JP2019/047933
§ 371 (c)(1),
(2) Date: Sep. 28, 2021

(87) PCT Pub. No.: WO2020/202644
PCT Pub. Date: Oct. 8, 2020

(65) Prior Publication Data
US 2022/0178853 A1    Jun. 9, 2022

(30) Foreign Application Priority Data

Mar. 29, 2019  (JP) .............................. JP2019-065572

(51) Int. Cl.
*G01N 23/223*       (2006.01)
*G01B 15/02*        (2006.01)

(52) U.S. Cl.
CPC .......... *G01N 23/223* (2013.01); *G01B 15/02* (2013.01); *G01N 2223/076* (2013.01); *G01N 2223/507* (2013.01)

(58) Field of Classification Search
CPC .......... G01N 23/223; G01N 2223/076; G01N 2223/507; G01B 15/02
See application file for complete search history.

(56) References Cited

U.S. PATENT DOCUMENTS

| 6,118,844 A | 9/2000 | Fischer |
| 7,382,855 B2 | 6/2008 | Tani et al. |

(Continued)

FOREIGN PATENT DOCUMENTS

| JP | 05-264480 A | 10/1993 |
| JP | 2000-065765 A | 3/2000 |

(Continued)

OTHER PUBLICATIONS

International Search Report for PCT/JP2019/047933 dated Mar. 10, 2020 [PCT/ISA/210].

(Continued)

*Primary Examiner* — Courtney D Thomas
(74) *Attorney, Agent, or Firm* — Sughrue Mion, PLLC

(57) ABSTRACT

An X-ray fluorescence spectrometer of the present invention includes a counting time calculation unit (13) configured to: by a predetermined quantitative calculation method, determine each of quantitative values by using reference intensities of one standard sample and repeatedly perform a procedure of determining each of the quantitative values in a case where only a measured intensity of one of measurement lines is changed by a predetermined value, to calculate a ratio of a change in each of the quantitative values to the predetermined value as a quantitative-value-to-intensity change ratio, the one of the measurement lines having the measured intensity to be changed being different on each repetition of the procedure; and use quantitative-value-to-intensity change ratios calculated thereby for all the measurement lines to calculate a counting time for each of the measurement lines from a quantification precision specified for each of the quantitative values.

2 Claims, 3 Drawing Sheets

(56) References Cited

U.S. PATENT DOCUMENTS

| | | | |
|---|---|---|---|
| 7,742,565 B2 | 6/2010 | Kawabe | |
| 2003/0118148 A1* | 6/2003 | Kataoka | G01J 3/443 378/115 |
| 2007/0248211 A1 | 10/2007 | Tani et al. | |
| 2009/0310748 A1 | 12/2009 | Kawabe | |
| 2017/0322165 A1 | 11/2017 | Yamada et al. | |

FOREIGN PATENT DOCUMENTS

| | | |
|---|---|---|
| JP | 2000-074857 A | 3/2000 |
| JP | 2001-133419 A | 5/2001 |
| JP | 2003-270177 A | 9/2003 |
| JP | 2009-097957 A | 5/2009 |
| JP | 2014-035334 A | 2/2014 |
| WO | 2005/106440 A1 | 11/2005 |

OTHER PUBLICATIONS

Written Opinion for PCT/JP2019/047933 dated Mar. 10, 2020 {PCT/SA/237}.
Decision to Grant a Patent for JP 2019-065572 dated Jun. 30, 2020.
Ekinci et al., "Determination of the Sample Thicknesses By Intensity Ratio Measurement By Energy Dispersive X-Ray Fluorescence Spectrometry", Instrumentation Science & Technology, vo. 27, No. 3, pp. 181-189, 1999 (9 pages total).
Partial Supplementary European Search Report dated Apr. 12, 2022 from the European Patent Office in EP Application No. 19922291.0.

* cited by examiner

X-RAY FLUORESCENCE SPECTROMETER

CROSS REFERENCE TO THE RELATED APPLICATION

This application is a National Stage of International Application No. PCT/JP2019/047933 filed Dec. 6, 2019 based on and claims Convention priority to Japanese patent application No. 2019-065572, filed Mar. 29, 2019, the entire disclosure of which is herein incorporated by reference as a part of this application.

BACKGROUND OF THE INVENTION

Field of the Invention

The present invention relates to an X-ray fluorescence spectrometer configured to determine a quantitative value of a content of a component in a sample and/or a quantitative value of a thickness of a sample with a specified quantification precision or in a specified counting time.

Description of Related Art

In X-ray fluorescence spectrometry, a quantification precision depends on a counting time as well as on a content of a component in a sample and/or a peak intensity and a background intensity of fluorescent X-rays, and it is not easy to determine a counting time such that a desired quantification precision is achieved. For this reason, as an X-ray fluorescence spectrometer capable of performing measurement in a suitable counting time and with a suitable quantification precision, there is an X-ray fluorescence spectrometer configured to calculate a counting time such that a relative precision of an intensity of a measurement line (hereinafter, referred to as intensity relative precision) attains a specified quantification precision, on an assumption that a measured intensity of the measurement line is proportional to a content of a corresponding component (see Patent Document 1).

RELATED DOCUMENT

Patent Document

[Patent Document 1] JP Laid-open Patent Publication No. 2000-65765

SUMMARY OF THE INVENTION

However, in a case where a content of e.g. Cr, which is a high-content element in stainless steel, is analyzed using a Cr-K$\alpha$ line as a measurement line by the calibration curve method, the above assumption is not valid because a calibration curve of Cr is an upward convex curve and because a quantification precision of the component to be analyzed is also affected by a quantification precision of a coexisting component(s). Therefore, an intensity relative precision of a measurement line and a quantitative relative precision do not correspond exactly. Similarly, in a case where a thin film sample is analyzed in terms of a content of each component in the sample and a film thickness by the fundamental parameter method, an intensity relative precision of a measurement line and a quantitative relative precision do not correspond exactly, either.

In view of the conventional problem, an object of the present invention is to provide an X-ray fluorescence spectrometer capable of performing measurement in a suitable counting time and with a suitable quantification precision, regardless of the sample type and the quantitative calculation method.

In order to achieve the object, a first aspect of the present invention is directed to an X-ray fluorescence spectrometer configured to irradiate a sample with primary X-rays to determine at least one of a quantitative value of a content of a component in the sample and a quantitative value of a thickness of the sample on the basis of measured intensities of secondary X-rays generated, the X-ray fluorescence spectrometer including a counting time calculation unit configured to calculate a counting time for each of measurement lines which are secondary X-rays having intensities to be measured.

The counting time calculation unit is configured to perform the following process. First, the counting time calculation unit measures a plurality of standard samples to determine calibration curve constants and correction coefficients, or instrument sensitivity constants for a predetermined quantitative calculation method, each of the standard samples being measured in a predetermined provisional counting time. Next, when a quantification precision is specified for each of quantitative values of one standard sample, a measured intensity of each of the measurement lines is set as a reference intensity. Next, the counting time calculation unit, by the predetermined quantitative calculation method, determines each of the quantitative values by using the reference intensities and repeatedly performs a first procedure of determining each of the quantitative values in a case where only the measured intensity of one of the measurement lines is changed by a predetermined value, to calculate a ratio of a change in each of the quantitative values to the predetermined value as a quantitative-value-to-intensity change ratio, the one of the measurement lines having the measured intensity to be changed being different on each repetition of the first procedure.

Next, for each measurement line having the changed measured intensity, the counting time calculation unit calculates an intensity precision of each of the quantitative values after change by dividing the specified quantification precision by the corresponding quantitative-value-to-intensity change ratio and sets an intensity precision having a smallest absolute value as a provisional necessary intensity precision. Next, for each of the measurement lines, the counting time calculation unit calculates a counting time for obtaining the provisional necessary intensity precision on the basis of the reference intensity. Next, for each of the quantitative values, the counting time calculation unit calculates an estimated quantification precision on the basis of the provisional necessary intensity precision of each of the measurement lines and the corresponding quantitative-value-to-intensity change ratio and compares the estimated quantification precision with the specified quantification precision. Next, if all the quantitative values have estimated quantification precisions satisfying specified quantification precisions, the process proceeds to a step of outputting a final counting time, and if not, the process proceeds to the following step.

Next, for each quantitative value having the estimated quantification precision not satisfying the specified quantification precision, the counting time calculation unit repeatedly performs a procedure of calculating an intensity precision of each of the measurement lines in a case where only a counting time of one of the measurement lines is increased by a predetermined time on the basis of the reference intensity, calculating an estimated quantification precision on the basis of the calculated intensity precision of each of the measurement lines and the corresponding quantitative-value-to-intensity change ratio, setting a difference between the calculated estimated quantification precision and the previously calculated estimated quantification precision as an expected improved quantification precision, and calculating a necessary additional time by multiplying a ratio of a difference between the previously calculated estimated quantification precision and the specified quantification precision to the expected improved quantification precision by the predetermined time, the one of the measurement lines having the counting time to be increased being different on each repetition of the procedure. The counting time calculation unit increases only the counting time of one measurement line having a shortest necessary additional time by a predetermined multiple of the corresponding necessary additional time to calculate an intensity precision of each of the measurement lines, and calculates and updates an estimated quantification precision.

Next, if the updated estimated quantification precision does not satisfy the specified quantification precision, the counting time calculation unit repeatedly updates the estimated quantification precision until the updated quantification precision satisfies the specified quantification precision, and if the updated quantification precision satisfies the specified quantification precision, the process proceeds to the following step. Next, if there is any quantitative value having a latest estimated quantification precision not satisfying the specified quantification precision, the process proceeds to a step of updating the estimated quantification precision of that quantitative value, and if not, the process proceeds to the following step. Finally, the counting time calculation unit adjusts a latest counting time of each of the measurement lines to predetermined digits in a predetermined unit and outputs the adjusted latest counting time as a final counting time.

The X-ray fluorescence spectrometer of the first aspect is configured to: by a predetermined quantitative calculation method, determine each of quantitative values by using a corresponding one of reference intensities of one standard sample and repeatedly perform a procedure of determining each of quantitative values in a case where only a measured intensity of one of measurement lines is changed by a predetermined value, to calculate a ratio of a change in each of the quantitative values to the predetermined value as a quantitative-value-to-intensity change ratio, the one of the measurement lines having the measured intensity to be changed being different on each repetition of the procedure; use quantitative-value-to-intensity change ratios calculated thereby for all the measurement lines to correct discrepancy between the reality and the assumption that a quantification precision of a certain quantitative value depends only on an intensity precision of one measurement line; and calculate a counting time for each of the measurement lines from a quantification precision specified for each of the quantitative values. Therefore, the X-ray fluorescence spectrometer can perform measurement in a suitable counting time and with a suitable quantification precision, regardless of the sample type and the quantitative calculation method.

A second aspect of the present invention is directed to an X-ray fluorescence spectrometer configured to irradiate a sample with primary X-rays to determine at least one of a quantitative value of a content of a component in the sample and a quantitative value of a thickness of the sample on the basis of measured intensities of secondary X-rays generated, the X-ray fluorescence spectrometer including a quantification precision calculation unit configured to calculate a quantification precision of each of the quantitative values.

The quantification precision calculation unit is configured to perform the following process. First, the quantification precision calculation unit measures a plurality of standard samples to determine calibration curve constants and correction coefficients, or instrument sensitivity constants for a predetermined quantitative calculation method. Next, when a counting time is specified for each of measurement lines of one standard sample, which are secondary X-rays having intensities to be measured, a measured intensity of each of the measurement lines is set as a reference intensity. Next, by the predetermined quantitative calculation method, the quantification precision calculation unit determines each of the quantitative values by using the reference intensities and repeatedly performs a second procedure of determining each of the quantitative values in a case where only the measured intensity of one of the measurement lines is changed by a predetermined value, to calculate a ratio of a change in each of the quantitative values to the predetermined value as a quantitative-value-to-intensity change ratio, the one of the measurement lines having the measured intensity to be changed being different on each repetition of the second procedure. Finally, the quantification precision calculation unit calculates an intensity precision of each of the measurement lines on the basis of the specified counting time and the reference intensity, calculates a quantification precision of each of the quantitative values on the basis of the intensity precision of each of the measurement lines and the corresponding quantitative-value-to-intensity change ratio, and outputs the quantification precision.

The X-ray fluorescence spectrometer of the second aspect is configured to: by a predetermined quantitative calculation method, determine each of quantitative values by using a corresponding one of reference intensities of one standard sample and repeatedly perform a procedure of determining each of quantitative values in a case where only a measured intensity of one of measurement lines is changed by a predetermined value, to calculate a ratio of a change in each of the quantitative values to the predetermined value as a quantitative-value-to-intensity change ratio, the one of the measurement lines having the measured intensity to be changed being different on each repetition of the procedure; use quantitative-value-to-intensity change ratios calculated thereby for all the measurement lines to correct discrepancy between the reality and the assumption that a quantification precision of a certain quantitative value depends only on an intensity precision of one measurement line; and calculate a quantification precision of each of the quantitative values from a counting time specified for each of the measurement lines. Therefore, the X-ray fluorescence spectrometer can perform measurement in a suitable counting time and with a suitable quantification precision, regardless of the sample type and the quantitative calculation method.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF EMBODIMENTS

Figure 3:
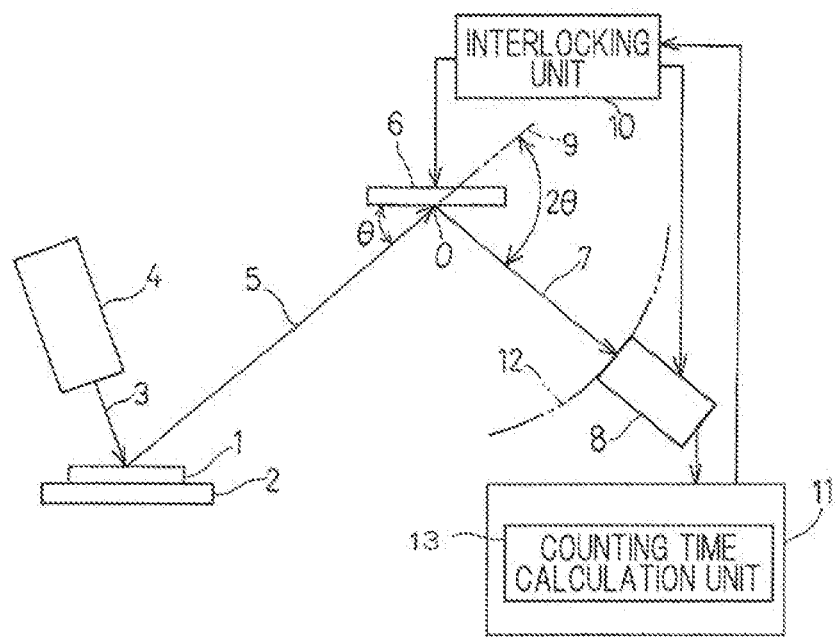
FIG. 3 schematically illustrates the X-ray fluorescence spectrometer according to the first embodiment of the present invention.

Hereinafter, a spectrometer according to a first embodiment of the present invention will be described with reference to the drawings. As shown in FIG. 3, the spectrometer is an X-ray fluorescence spectrometer configured to irradiate a sample 1 (including both of an unknown sample and a standard sample) with primary X-rays 3 to determine a quantitative value of a content of a component in the sample 1 and/or a quantitative value of a thickness of the sample 1 on the basis of measured intensities of secondary X-rays 5 generated, the X-ray fluorescence spectrometer including: a sample stage 2 configured to support the sample 1 thereon; an X-ray source 4 (such as an X-ray tube) configured to irradiate the sample 1 with the primary X-rays 3; a spectroscopic device 6 configured to monochromate the secondary X-rays 5 (such as fluorescent X-rays) generated from the sample 1; a detector 8 configured to receive the secondary X-rays 7 monochromated by the spectroscopic device 6 and to detect an intensity of the secondary X-rays 7. An output from the detector 8 passes through an amplifier, a pulse height analyzer, a counting unit and the like (none of them are illustrated) and is input to a control unit 11 such as a computer for controlling the whole spectrometer.

The spectrometer is a wavelength dispersive and sequential X-ray fluorescence spectrometer including an interlocking unit 10 (i.e. a so-called goniometer) configured to interlock the spectroscopic device 6 and the detector 8 so as to change the wavelength of the secondary X-rays 7 entering the detector 8. When the secondary X-rays 5 enter the spectroscopic device 6 at a certain incident angle θ, an extension line 9 of the secondary X-rays 5 and the secondary X-rays 7 monochromated (diffracted) by the spectroscopic device 6 define a spectroscopic angle 2θ therebetween, which corresponds to twice the incident angle θ. The interlocking unit 10 is configured to rotate the spectroscopic device 6 by a rotation angle about an axis O perpendicular to a plane passing through the center of a surface of the spectroscopic device and to rotate the detector 8 by an angle twice as wide as the rotation angle about the axis O along a circle 12, so that the spectroscopic angle 2θ is changed so as to change the wavelengths of the secondary X-rays 7 to be monochromated while the monochromated secondary X-rays 7 is allowed to enter the detector 8. The value of the spectroscopic angle 2θ (angle of 2θ) is input into the control unit 11 from the interlocking unit 10.

The control unit 11 is configured to stop the interlocking unit 10 at a corresponding spectroscopic angle 2θ only for a predefined counting time to obtain a measured intensity of each of measurement lines, which are secondary X-rays 5 having intensities to be measured. The spectrometer of the first embodiment includes a counting time calculation unit 13 configured to calculate a counting time for each of the measurement lines as a program installed in the control unit 11. Note that a measured intensity of each of the measurement lines may be a gross intensity obtained by measuring only a peak or a net intensity obtained by measuring a peak and a background and subtracting the background from the peak. As long as a quantitative calculation method is consistently used through a series of steps as described later, either the calibration curve method or the fundamental parameter method (hereinafter, also referred to as FP method) may be used as the predetermined quantitative calculation method for determining a quantitative value on the basis of measured intensities.

Figure 1:
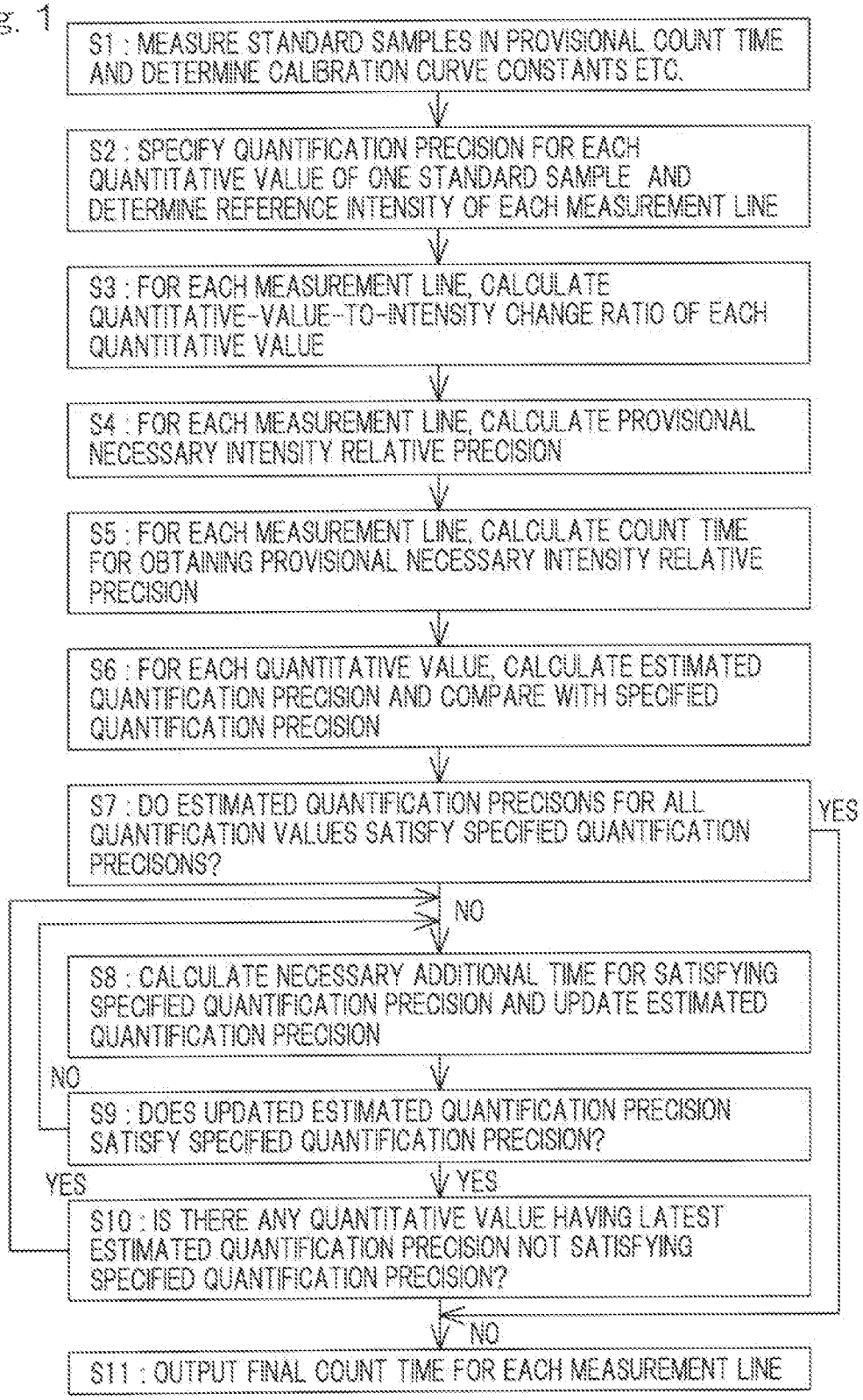
FIG. 1 is a flowchart illustrating an operation of an X-ray fluorescence spectrometer according to a first embodiment of the present invention.

An operation of the X-ray fluorescence spectrometer of the first embodiment using the counting time calculation unit 13 will be described with reference to the flowchart of FIG. 1. First, in step S1, a plurality of standard samples are measured to determine calibration curve constants and correction coefficients, or instrument sensitivity constants for the predetermined quantitative calculation method, each of the standard samples being measured in a predetermined provisional counting time. That is, where the calibration curve method is employed, calibration curve constants and matrix correction coefficients, and if necessary an overlap correction coefficient(s), are determined. Where the FP method is employed, instrument sensitivity constants are determined. In this embodiment, the FP method is employed. The provisional counting time may be, for example, 80 seconds for components requiring high precision and 40 seconds for other ordinary components. It is also possible to set the provisional counting time to a short time period (e.g., 10 seconds) and, after a final counting time is obtained as described later, to measure each of the standard samples again in the final counting time to recalculate the necessary constants and/or coefficients. For each of the measurement lines, a background intensity is (background intensities are) measured as needed.

Next, in step S2, when a quantification precision is specified for each of quantitative values of one standard sample, a measured intensity of each of the measurement lines is set as a reference intensity. In an example of a thin film sample which is a two-element single-layer thin film containing Ni and Fe, Ni-Kα line is used as a measurement line to determine a quantitative value of a thickness of the film, and Fe-Kα line used as a measurement line to determine a quantitative value of a content of Fe, with a content of Ni being the balance. Table 1 shows standard values (thickness and composition in Table 1), the specified quantification precisions (specified quantification precision in Table 1), and the reference intensities (X-ray intensity in Table 1) in this example. Unlike in a case of only determining quantitative values of contents of respective components in a bulk sample, in a case of also determining a quantitative value of the thickness of the thin film sample, the measurement line and the quantitative value do not correspond to each other in a one-to-one relationship; for the sake of convenience, however, they are described in a corresponding manner as above. The "one standard sample" as used herein may be one of the standard samples used in step S1 or an imaginary standard sample having an assumed thickness and an assumed composition. In the latter case, the FP method may be used to calculate the reference intensity.

TABLE 1

|  |  | Thickness and composition | Specified quantification precision | Measurement line | X-ray intensity (kcps) |
|---|---|---|---|---|---|
| Thickness | nm | 100.0 | 0.30 | Ni Kα | 63.769 |
| Fe | mass % | 40.0 | 0.040 | Fe Kα | 44.602 |
| Ni | mass % | balance | — | — | — |

Next, in step S3, by the predetermined quantitative calculation method (FP method in this example), each of the quantitative values is determined by using the reference intensities and the following procedure is repeatedly performed: determining each of the quantitative values in a case where only the measured intensity of one of the measurement lines is changed by a predetermined value from an original measured intensity (i.e., reference intensity) to calculate a ratio of a change in each of the quantitative values to the predetermined value as a quantitative-value-to-intensity change ratio Fj according to the following formula (1), the one of the measurement lines having the measured intensity to be changed being different on each repetition of the procedure. When the quantitative-value-to-intensity change ratio $F_{ij}$ is calculated, in this embodiment, a change of the measured intensity of the measurement line i by the predetermined value is expressed as a value relative to the original measured intensity defined as 1 (i.e., relative change amount). In the present invention, however, it is also possible to use an amount of change in an absolute intensity relative to the original measured intensity (i.e., absolute change amount).

$$F_{ij} = \Delta W_{ij} / \Delta I_{reli} \quad (1)$$

wherein $F_{ij}$: a quantitative-value-to-intensity change ratio $\Delta I_{reli}$: a change of the measured intensity of the measurement line i by the predetermined value $\Delta W_{ij}$: a change of a quantitative value corresponding to a measurement line j due to the change of the measured intensity of the measurement line i by the predetermined value As for a case where, in the above example, the change of the measured intensity by the predetermined value corresponds to a 1% increase in the original intensity (i.e., reference intensity), Table 2 shows changes in the measured intensities and changes in the quantitative values, and Table 3 shows the quantitative-value-to-intensity change ratios $F_{ij}$. Note that the measured intensities ("intensity" in the tables) and the quantitative values after the change ("modified" or "modif." in the tables) are obtained by calculation, instead of being actually measured or quantified.

TABLE 2

|  | Reference intensity | | Ni intensity + 1% modif. | | Fe intensity + 1% modif. | |
|---|---|---|---|---|---|---|
|  | Reference intensity | Quantitative value | Ni modified intensity | Quantitative value | Fe modified intensity | Quantitative value |
| Thickness (nm) (Ni intensity) | 63.769 | 100.260 | 64.407 | 100.834 | 63.759 | 100.700 |
| Content (%) (Fe intensity) | 44.602 | 40.060 | 44.602 | 39.820 | 45.048 | 40.298 |

TABLE 3

|  | Ni modified intensity | Fe modified intensity |
|---|---|---|
| Thickness (nm) | 57.452 | 43.96 |
| Fe (mass %) | −24.04 | 23.75 |

As can be understood from Table 3, the change in the intensity of Ni-Kα line and the change in the intensity of Fe-Kα line strongly affect both the quantitative value of the thickness and the quantitative value of the content of Fe. By using the quantitative-value-to-intensity change ratio $F_{ij}$, a quantification precision $\sigma_{Wj}$ of a quantitative value corresponding to a measurement line j can be calculated from an intensity precision of the measurement line i (i.e., from an intensity relative precision $\sigma_{reli}$ of the measurement line i in this embodiment) according to the following formula (2). Even where a change of the measured intensity of the measurement line i by the predetermined value is an absolute change amount as described above, the calculated quantification precision $\sigma_{Wj}$ of the quantitative value will be the same, although the intensity precision of the measurement line is an absolute precision of the intensity (hereinafter, also referred to as intensity absolute precision).

$$\sigma^2_{Wj} = \Sigma_i F^2_{ij} \sigma^2_{reli} \quad (2)$$

wherein $\sigma_{Wj}$: a quantification precision of a quantitative value corresponding to the measurement line j $\sigma_{reli}$: an intensity relative precision of the measurement line i Next, in step S4, for each measurement line i having a changed measured intensity, an intensity relative precision $\sigma_{reli}$ of each of the quantitative values after the change is calculated by dividing the specified quantification precision $\sigma_{Wjs}$ by the corresponding quantitative-value-to-intensity change ratio $F_{ij}$ according to the following formula (3) which is obtained by conversion of the formula (2). At this stage, assuming that a quantification precision of a certain quantitative value (quantification precision $\sigma_{Wj}$ of a quantitative value corresponding to the measurement line j) depends only on an intensity relative precision of one measurement line (intensity relative precision $\sigma_{reli}$ of the measurement line i), an intensity relative precision necessary for that one measurement line (intensity relative precision $\sigma_{Wj}$ of the measurement line i) is calculated in order to obtain a specified quantification precision of that quantitative value (quantification precision $\sigma_{Wjs}$ specified for the quantitative value corresponding to the measurement line j). As shown in Table 4, for each measurement line i, an intensity relative precision having a smallest absolute value, i.e., a tightest intensity relative precision is set as a provisional necessary intensity relative precision. Note that where a change of the measured intensity of the measurement line i by the predetermined value is an absolute change amount as described above, an intensity absolute precision is calculated, instead of the intensity relative precision.

$$\sigma_{reli} = \sigma_{Wjs}/F_{ij} \tag{3}$$

wherein $\sigma_{Wjs}$: a quantification precision specified for a quantitative value corresponding to the measurement line j

TABLE 4

|  | Thickness and composition | Specified quantification precision | Ni intensity relative precision | Fe intensity relative precision |
|---|---|---|---|---|
| Thickness (nm) | 100.0 | 0.30 | 0.005222 | 0.006824 |
| Fe (mass %) | 40.0 | 0.04 | −0.001664 | 0.001684 |
| Provisional necessary relative precision | | | 0.001664 | 0.001684 |

In fact, as in the formula (2), a quantification precision of a certain quantitative value does not depend only on an intensity relative precision of one measurement line and is also influenced by intensity relative precisions of other measurement lines. Therefore, in order to obtain specified quantification precisions of all quantitative values, it is necessary to have an even smaller (tighter) intensity relative precision of each of the measurement lines than the provisional necessary intensity relative precision. Such an intensity relative precision may be calculated by the following procedure.

First, in subsequent step S5, a counting time T (sec) for obtaining the provisional necessary intensity relative precision $\sigma_{reli}$ is calculated for each of the measurement lines on the basis of the reference intensity I (kcps) according to a known formula (4) below. Table 5 shows the results.

$$T = 1/(\sigma^2_{reli} \times I \times 1000) \tag{4}$$

TABLE 6

| | Thickness and content | Specified quantif. precision | $FNij^2\sigma Ni^2$ | $FFej^2\sigma Fe^2$ | Estimated quantif. precision | Determination of estimated precision |
|---|---|---|---|---|---|---|
| Thickness (nm) | 100.0 | 0.30 | 0.0091 | 0.0055 | 0.120912 | Acceptable |
| Fe (mass %) | 40.0 | 0.04 | 0.0016 | 0.0016 | 0.056569 | Not acceptable |

Note that where a change of the measured intensity of the measurement line i by the predetermined value is an absolute change amount as described above, a counting time T for obtaining a provisional necessary intensity absolute precision $\sigma_i$ is calculated for each of the measurement lines on the basis of the reference intensity I according to a known formula (4-1) below, instead of the known formula (4).

$$T = 1/(\sigma^2_i \times 1000) \tag{4-1}$$

Next, in step S6, an estimated quantification precision $\sigma_{Wj}$ is calculated for each of the quantitative values on the basis of the provisional necessary intensity relative precision $\sigma_{reli}$ (step S4) of each of the measurement lines and the corresponding quantitative-value-to-intensity change ratio $F_{ij}$ (step S3) according to the formula (2) and is compared with the specified quantification precision $\sigma_{Wjs}$, as shown in Table 6.

TABLE 6

| | Thickness and content | Specified quantif. precision | $FNij^2\sigma Ni^2$ | $FFej^2\sigma Fe^2$ | Estimated quantif. precision | Determinataion of estimated precision |
|---|---|---|---|---|---|---|
| Thickness (nm) | 100.0 | 0.30 | 0.0091 | 0.0055 | 0.120912 | Acceptable |
| Fe (mass %) | 40.0 | 0.04 | 0.0016 | 0.0016 | 0.056569 | Not acceptable |

Determination of whether the estimated quantification precision $\sigma_{Wj}$ satisfies the specified quantification precision $\sigma_{Wjs}$ may be made based on, for example, whether the estimated quantification precision $\sigma_{Wj}$ is equal to or less than 103% ($\sigma_{Wjs} \times 1.03$) of the specified quantification precision $\sigma_{Wjs}$. As shown in Table 6, the quantitative value of the thickness has an estimated quantification precision equal to or less than 103% of the specified quantification precision, which satisfies the specified quantification precision. In contrast, the quantitative value of the content of Fe has an estimated quantification precision greater than 103% of the specified quantification precision, which does not satisfy the specified quantification precision.

Next, in step S7, if the estimated quantification precisions of all the quantitative values satisfy the specified quantification precisions, the process proceeds to a step of outputting a final counting time (step 11 as described later). If not, as in the above example, the process proceeds to the following step (step 8 as described below).

Next, in step S8, for each quantitative value having an estimated quantification precision not satisfying the specified quantification precision, an intensity relative precision $\sigma_{reli}$ of each of the measurement lines in a case where only the counting time T of one of the measurement lines is increased by a predetermined time (e.g., 1 second) is calculated on the basis of the reference intensity I according to a known formula (5) below as with the formula (4). In the above example, as shown in Repetition 1 of Table 7, an intensity relative precision $\sigma_{reli}$ of each of the measurement lines is calculated for the quantitative value of the content of Fe.

$$\sigma_{reli} = 1/(T \times I \times 1000)^{1/2} \quad (5)$$

only the counting time T of one of the measurement lines is increased by a predetermined time is calculated on the basis of the reference intensity I according to a known formula (5-1) below, instead of the known formula (5).

$$\sigma_i = (I/(T \times 1000))^{1/2} \quad (5\text{-}1)$$

Further, as in step S6, an estimated quantification precision is calculated according to the formula (2) on the basis of the calculated intensity relative precision $\sigma_{reli}$ of each of the measurement lines and the corresponding quantitative-value-to-intensity change ratio $F_{ij}$. In the above example, as shown in Repetition 1 of Table 7, the calculation gives 0.054405 and 0.054957. Further, a difference between the calculated estimated quantification precision and the previously calculated estimated quantification precision is employed as an expected improved quantification precision. In the above example, as shown in Repetition 1 of Table 7, differences from 0.056569 in Table 6 are calculated as expected improved quantification precisions (quantification precision difference in Table 7) of 0.002163 and 0.001611. Further, a necessary additional time $T_{ia}$ is calculated by multiplying a ratio of a difference of the previously calculated estimated quantification precision and the specified quantification precision relative to the expected improved quantification precision by the predetermined time. In the above example, in a case where only the counting time of Ni-Kα line is increased by a predetermined time $\Delta T_i$ (1 second), the necessary additional time $T_{ia}$ is calculated as 7.66 seconds according to the following formula (6).

$$T_{ia} = ((0.056569 - 0.04)/0.002163) \times \Delta T_i \quad (6)$$

$\sigma_{Wjs}$: a quantification precision specified for a quantitative value corresponding to the measurement line j

TABLE 7

| | Ni Kα | Fe Kα | Total time | Fe estimated quantif. precision | Quantif. precision difference | Necessary additional time |
|---|---|---|---|---|---|---|
| Repetition 1 | | | | | | |
| Counting time (Ni + 1) | 6.66 | 7.90 | 14.57 | | | |
| Intensity relative precision | 0.00153 | 0.00168 | | 0.054405 | 0.002163 | 7.66 |
| Counting time (Fe + 1) | 5.66 | 8.90 | 14.57 | | | |
| Intensity relative precision | 0.00166 | 0.00159 | | 0.054957 | 0.001611 | 10.28 |
| Updated counting time | 13.32 | 7.90 | 21.23 | | | |
| Intensity relative precision | 0.00108 | 0.00168 | | 0.047752 | 0.007752 | |
| Repetition 2 | | | | | | |
| Counting time (Ni + 1) | 14.32 | 7.90 | 22.23 | | | |
| Intensity relative precision | 0.00105 | 0.00168 | | 0.047252 | 0.000500 | 15.51 |
| Counting time (Fe + 1) | 13.32 | 8.90 | 22.23 | | | |
| Intensity relative precision | 0.00108 | 0.00159 | | 0.045832 | 0.001920 | 4.04 |
| Updated counting time | 13.32 | 11.94 | 25.26 | | | |
| Intensity relative precision | 0.00108 | 0.00137 | | 0.041705 | 0.001705 | |
| Repetition 3 | | | | | | |
| | Ni Kα | Fe Kα | Total time | Fe estimated quantif. precision | | |
| Measurement time calculation | 13.32 | 13.66 | 26.98 | — | | |
| Intensity relative precision | 0.00108 | 0.00128 | — | 0.40077 | | |

Where a change of the measured intensity of the measurement line i by the predetermined value is an absolute change amount as described above, an intensity absolute precision $\sigma_i$ of each of the measurement lines in a case where Further, this procedure is repeated by changing the measurement line having the counting time to be increased. In the above example, as shown in Repetition 1 of Table 7, in a case where only the counting time of Fe-Kα line is increased by the predetermined time $\Delta T_i$ (1 second), the necessary additional time $T_{in}$ is also calculated as 10.28 seconds. Then, only the counting time of one measurement line having a shortest necessary additional time $T_{in}$ is increased by a predetermined multiple (e.g., 1 times) of the corresponding necessary additional time $T_{in}$ to calculate an intensity relative precision $\sigma_{reli}$ of each of the measurement lines according to the formula (5), and an estimated quantification precision is calculated and updated according to the formula (2). In the above example, as shown in Repetition 1 of Table 7, only the counting time of Ni-Kα line is increased by 7.66 seconds, and the estimated quantification precision is thereby updated to 0.047752. In terms of convergence, the predetermined multiple may be, for example, 0.5 times.

Next, in step S9, if the updated estimated quantification precision does not satisfy the specified quantification precision, the update of the estimated quantification precision according to step S8 is repeated until the updated estimated quantification precision satisfies the specified quantification precision, and if the updated estimated quantification precision satisfies the specified quantification precision, the process proceeds to a next step (step S10). In the above example, the estimated quantification precision of the quantitative value of the content of Fe is repeatedly updated according to step S8 as shown in Repetition 2 and Repetition 3 of Table 7. When the updated estimated quantification precision attains 0.040077, which is equal to or less than 103% of the specified quantification precision of 0.04 and thus satisfies the specified quantification precision, the process proceeds to step S10.

Next, in step S10, if there is any quantitative value having a latest estimated quantification precision not satisfying the specified quantification precision, the process proceeds to the step of updating the estimated quantification precision of the quantitative value (step S8), and if not, the process proceeds to a next step (step S11). In the above example, there is no quantitative value having a latest estimated quantification precision not satisfying the specified quantification precision, the process proceeds to step S11. Note that in step S7, where there are multiple quantitative values each having a latest estimated quantification precision not satisfying the specified quantification precision, it is desirable that the process proceeds to a step of updating the estimated quantification precision of, preferentially, a quantitative value having a greater ratio of the latest estimated quantification precision to the specified quantification precision (step S8).

Finally, in step S11, the latest counting time of each of the measurement lines is adjusted to predetermined digits in a predetermined unit and is output as a final counting time. In the above example, 13.32 seconds and 13.66 seconds in Repetition 3 of Table 7 are adjusted by rounding up the numbers in the decimal places to the ones places in the predetermined unit of seconds, to both give 14 seconds as shown in Table 8. These are output as the final counting times. Table 8 also shows the respective quantification precisions calculated on the basis of the final counting times. As described for step 1, if the final counting time is longer than the provisional counting time of step 1, the specified quantification precision cannot be satisfied with the constants and coefficients calculated in step 1, so that it is desirable to measure each of the standard samples again in the final counting time and to recalculate the constants and coefficients calculated in step 1 in order to use them in actual analysis. Contrarily, if the final counting time is equal to or shorter than the provisional counting time of step 1, it is not necessary to measure the standard samples again. Therefore, in view of this, the provisional counting time of step 1 may preferably be set rather long.

TABLE 8

| Ni measurement time (sec) | 14 |
|---|---|
| Fe measureinent time (sec) | 14 |
| Thickness quantification precision (nm) | 0.082 |
| Fe quantification precision (mass %) | 0.039 |

As described above, the precision achieved by the X-ray fluorescence spectrometer is influenced not only by variation due to statistical error of counting, but also by reproducibility of hardware of the spectrometer, so that there is a limit to a relative precision of the intensity to be obtained. The above description is made with reference to the case where a change of a measured intensity of a measurement line by a predetermined value is a relative change amount and the case where such a change is an absolute change amount, that is, the case where an intensity relative precision is used and the case where an intensity absolute precision is used. Where the intensity relative precision is used, it is possible to determine that a counting time for obtaining the specified quantification precision cannot be calculated when an intensity relative precision satisfying the specified quantification precision is smaller than a smallest intensity relative precision (e.g., 0.0002) achieved by the spectrometer. In view of this, it is preferable to use the intensity relative precision.

As described above, the X-ray fluorescence spectrometer of the first embodiment uses the quantitative-value-to-intensity change ratios Fj calculated for all the measurement lines to correct discrepancy between the reality and the assumption that a quantification precision of a certain quantitative value depends only on an intensity relative precision of one measurement line and calculates a counting time for each of the measurement lines from the specified quantification precision for each of the quantitative values. Therefore, the X-ray fluorescence spectrometer can perform measurement in a suitable counting time and with a suitable quantification precision, regardless of the sample type and the quantitative calculation method. Although the above description refers to the case where a quantitative value of a content and a quantitative value of a thickness of a thin film sample are determined, there may be a plurality of quantitative values of contents and/or a plurality of quantitative values of thicknesses to be determined. Similarly, in a case where only quantitative values of contents in a bulk sample is determined, it is possible to calculate a counting time for each of the measurement lines from the specified quantification precision for each of the quantitative values.

Figure 2:
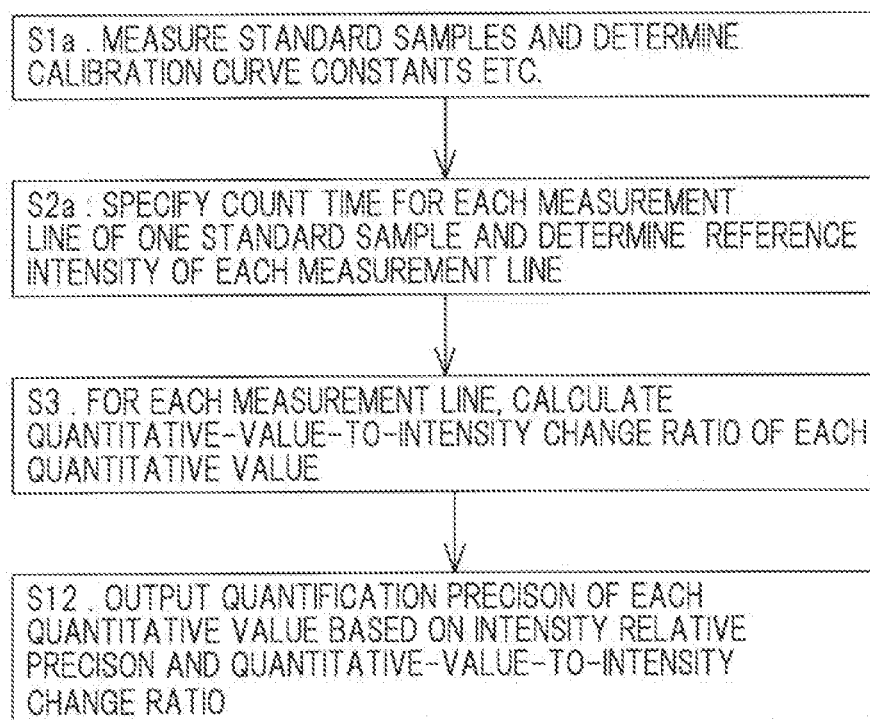
FIG. 2 is a flowchart illustrating an operation of an X-ray fluorescence spectrometer according to a second embodiment of the present invention.
Figure 4:
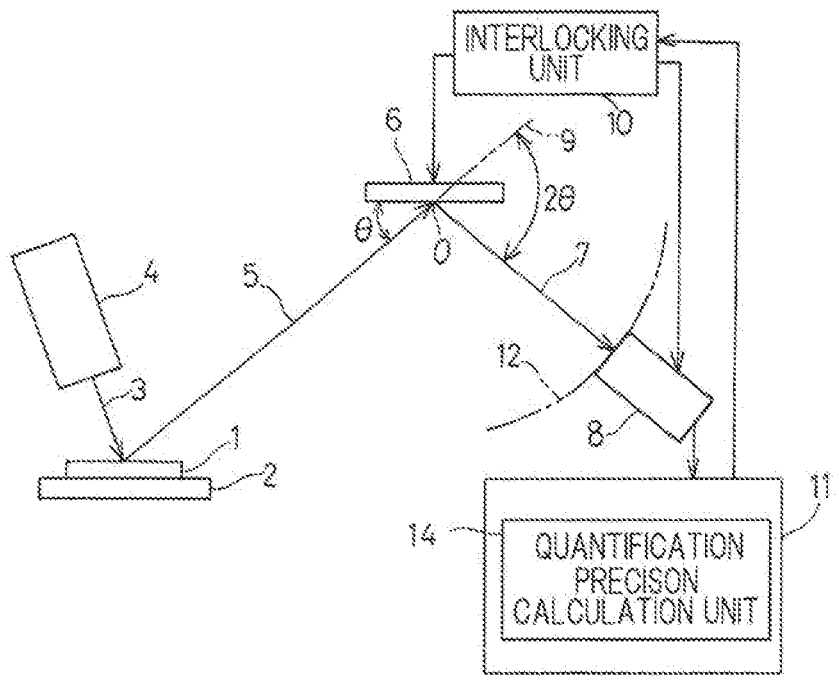
FIG. 4 schematically illustrates the X-ray fluorescence spectrometer according to the second embodiment of the present invention.

Next, an X-ray fluorescence spectrometer of a second embodiment of the present invention will be described. As shown in FIG. 4, the X-ray fluorescence spectrometer of the second embodiment differs from the X-ray fluorescence spectrometer of the first embodiment as shown in FIG. 3 only in that the spectrometer of the second embodiment includes a quantification precision calculation unit 14 configured to calculate a quantification precision for each of quantitative values, instead of the counting time calculation unit 13, as a program installed in the control unit 11. Therefore, description will be made only to an operation of the X-ray fluorescence spectrometer of the second embodiment using the quantification precision calculation unit 14 with reference to the flowchart of FIG. 2.

First, in step S1a, as with step S1 of the spectrometer of the first embodiment, a plurality of standard samples are measured to determine calibration curve constants and correction coefficients, or instrument sensitivity constants for a predetermined quantitative calculation method, each of the standard samples being measured in a predetermined provisional counting time. That is, where the calibration curve method is employed, calibration curve constants and matrix correction coefficients, and if necessary an overlap correction coefficient(s), are determined. Where the FP method is employed, instrument sensitivity constants are determined. In step S1a, however, it may also be possible to use a counting time specified for each of measurement lines, instead of the predetermined provisional counting time.

Next, in step S2a, when a counting time is specified for each of the measurement lines of one standard sample, which are secondary X-rays having intensities to be measured, a measured intensity of each of the measurement lines is set as a reference intensity, as with step S2 of the spectrometer of the first embodiment.

Subsequent step S3 is the same as step S3 of the spectrometer of the first embodiment. In this step, by the predetermined quantitative calculation method, each of the quantitative values is determined by using the reference intensities and the following procedure is repeatedly performed: determining each of the quantitative values in a case where only the measured intensity of one of the measurement lines is changed by a predetermined value from an original measured intensity (i.e., reference intensity) to calculate a ratio of a change in each of the quantitative values to the predetermined value as a quantitative-value-to-intensity change ratio $F_{ij}$ according the formula (1), the one of the measurement lines having the measured intensity to be changed being different on each repetition of the procedure. When the quantitative-value-to-intensity change ratio $F_{ij}$ is calculated, also in the second embodiment, a change of the measured intensity of the measurement line i by the predetermined value is expressed as a value relative to the original measured intensity defined as 1 (i.e., relative change amount). In the present invention, however, it is also possible to use an amount of change in an absolute intensity relative to the original measured intensity (i.e., absolute change amount). In such a case, an intensity absolute precision is used, instead of the intensity relative precision, in the following steps as described above.

Next, in step S12, an intensity relative precision of each of the measurement lines is calculated on the basis of the specified counting time and the reference intensity according to the formula (5), and a quantification precision $\sigma_{Wj}$ of each of the quantitative values is calculated and output on the basis of the intensity relative precision $\sigma_{reli}$ of each of the measurement lines and the corresponding quantitative-value-to-intensity change ratio $F_{ij}$ according to the formula (2).

As described above, the X-ray fluorescence spectrometer of the second embodiment uses the quantitative-value-to-intensity change ratios $F_{ij}$ calculated for all the measurement lines to correct discrepancy between the reality and the assumption that a quantification precision of a certain quantitative value depends only on an intensity relative precision of one measurement line and calculates a quantification precision of each of the quantitative values from the specified counting time for each of the measurement lines. Therefore, the X-ray fluorescence spectrometer can perform measurement in a suitable counting time and with a suitable quantification precision, regardless of the sample type and the quantitative calculation method.

Although the present invention has been fully described in connection with the preferred examples thereof with reference to the accompanying drawings, those skilled in the art will readily conceive numerous changes and modifications within the scope of present invention upon reading the present specification. Accordingly, such changes and modifications are to be construed as included in the scope of the present invention as defined in the claims.

REFERENCE NUMERALS

1 . . . sample
3 . . . primary X-rays
5 . . . secondary X-rays (measurement line)
13 . . . counting time calculation unit
14 . . . quantification precision calculation unit

What is claimed is:

1. An X-ray fluorescence spectrometer configured to irradiate a sample with primary X-rays to determine at least one of a quantitative value of a content of a component in the sample and a quantitative value of a thickness of the sample on the basis of measured intensities of secondary X-rays generated, the X-ray fluorescence spectrometer comprising a counting time calculation unit configured to calculate a counting time for each of measurement lines which are secondary X-rays having intensities to be measured, wherein the counting time calculation unit is configured to:

measure a plurality of standard samples to determine calibration curve constants and correction coefficients, or instrument sensitivity constants for a predetermined quantitative calculation method, each of the standard samples being measured in a predetermined provisional counting time;

when a quantification precision is specified for each of quantitative values of one standard sample, set a measured intensity of each of the measurement lines as a reference intensity;

by the predetermined quantitative calculation method, determine each of the quantitative values by using the reference intensities and repeatedly perform a first procedure of determining each of the quantitative values in a case where only the measured intensity of one of the measurement lines is changed by a predetermined value, to calculate a ratio of a change in each of the quantitative values to the predetermined value as a quantitative-value-to-intensity change ratio, the one of the measurement lines having the measured intensity to be changed being different on each repetition of the first procedure;

for each measurement line having the changed measured intensity, calculate an intensity precision of each of the quantitative values after change by dividing the specified quantification precision by the corresponding quantitative-value-to-intensity change ratio and set an intensity precision having a smallest absolute value as a provisional necessary intensity precision;

for each of the measurement lines, calculate a counting time for obtaining the provisional necessary intensity precision on the basis of the reference intensity;

for each of the quantitative values, calculate an estimated quantification precision on the basis of the provisional necessary intensity precision of each of the measurement lines and the corresponding quantitative-value-to-intensity change ratio and compare the estimated quantification precision with the specified quantification precision;

if all the quantitative values have estimated quantification precisions satisfying specified quantification precisions, proceed to a step of outputting a final counting time, and if not, proceed to the following step;

for each quantitative value having the estimated quantification precision not satisfying the specified quantification precision, repeatedly perform a second procedure of calculating an intensity precision of each of the measurement lines in a case where only a counting time of one of the measurement lines is increased by a predetermined time on the basis of the reference intensity, calculating an estimated quantification precision on the basis of the calculated intensity precision of each of the measurement lines and the corresponding quantitative-value-to-intensity change ratio, setting a difference between the calculated estimated quantification precision and the previously calculated estimated quantification precision as an expected improved quantification precision, and calculating a necessary additional time by multiplying a ratio of a difference between the previously calculated estimated quantification precision and the specified quantification precision to the expected improved quantification precision by the predetermined time, the one of the measurement lines having the counting time to be increased being different on each repetition of the second procedure, increase only the counting time of one measurement line having a shortest necessary additional time by a predetermined multiple of the corresponding necessary additional time to calculate an intensity precision of each of the measurement lines, and calculate and update an estimated quantification precision;

if the updated estimated quantification precision does not satisfy the specified quantification precision, repeatedly update the estimated quantification precision until the updated quantification precision satisfies the specified quantification precision, and if the updated quantification precision satisfies the specified quantification precision, proceed to the following step;

if there is any quantitative value having a latest estimated quantification precision not satisfying the specified quantification precision, proceed to a step of updating the estimated quantification precision of that quantitative value, and if not, proceed to the following step; and adjust a latest counting time of each of the measurement lines to predetermined digits in a predetermined unit and output the adjusted latest counting time as a final counting time.

2. An X-ray fluorescence spectrometer configured to irradiate a sample with primary X-rays to determine at least one of a quantitative value of a content of a component in the sample and a quantitative value of a thickness of the sample on the basis of measured intensities of secondary X-rays generated, the X-ray fluorescence spectrometer comprising a quantification precision calculation unit configured to calculate a quantification precision of each of the quantitative values, wherein the quantification precision calculation unit is configured to:

measure a plurality of standard samples to determine calibration curve constants and correction coefficients, or instrument sensitivity constants for a predetermined quantitative calculation method;

when a counting time is specified for each of measurement lines of one standard sample, which are secondary X-rays having intensities to be measured, set a measured intensity of each of the measurement lines as a reference intensity;

by the predetermined quantitative calculation method, determine each of the quantitative values by using the reference intensities and repeatedly perform a procedure of determining each of the quantitative values in a case where only the measured intensity of one of the measurement lines is changed by a predetermined value, to calculate a ratio of a change in each of the quantitative values to the predetermined value as a quantitative-value-to-intensity change ratio, the one of the measurement lines having the measured intensity to be changed being different on each repetition of the procedure; and calculate an intensity precision of each of the measurement lines on the basis of the specified counting time and the reference intensity, calculate a quantification precision of each of the quantitative values on the basis of the intensity precision of each of the measurement lines and the corresponding quantitative-value-to-intensity change ratio, and output the quantification precision.

* * * * *